United States Patent
Wang et al.

(10) Patent No.: US 10,261,507 B2
(45) Date of Patent: Apr. 16, 2019

(54) METHOD AND DEVICE FOR CONTROLLING UNMANNED AERIAL VEHICLE WITH GESTURE

(71) Applicant: BEIJING ZERO ZERO INFINITY TECHNOLOGY CO., LTD, Beijing (CN)

(72) Inventors: Mengqiu Wang, Beijing (CN); Tong Zhang, Beijing (CN); Qicheng Li, Beijing (CN); Jia Lu, Beijing (CN); Lixin Liu, Beijing (CN)

(73) Assignee: BEIJING ZERO ZERO INFINITY TECHNOLOGY CO., LTD, Beijing (CN)

( * ) Notice: Subject to any disclaimer, the term of this patent is extended or adjusted under 35 U.S.C. 154(b) by 339 days.

(21) Appl. No.: 15/108,390

(22) PCT Filed: Jan. 11, 2016

(86) PCT No.: PCT/CN2016/070584
§ 371 (c)(1),
(2) Date: Jun. 27, 2016

(87) PCT Pub. No.: WO2017/049817
PCT Pub. Date: Mar. 30, 2017

(65) Prior Publication Data
US 2018/0196419 A1    Jul. 12, 2018

(30) Foreign Application Priority Data
Sep. 24, 2015  (CN) .......................... 2015 1 0616129

(51) Int. Cl.
*G05D 1/00*         (2006.01)
*G05D 1/08*         (2006.01)
(Continued)

(52) U.S. Cl.
CPC ......... *G05D 1/0016* (2013.01); *B64C 39/024* (2013.01); *B64D 47/08* (2013.01);
(Continued)

(58) Field of Classification Search
CPC ....... G05D 1/08; G06F 3/017; G06K 9/00355
(Continued)

(56) References Cited

U.S. PATENT DOCUMENTS 9,129,154 B2 *   9/2015  Kim ................... G06K 9/00355
2013/0253733 A1 * 9/2013  Lee .......................... B64C 19/00
                                                        701/2
(Continued)

FOREIGN PATENT DOCUMENTS

CN        102662460 A        9/2012
CN        102855649 A        1/2013
(Continued)

OTHER PUBLICATIONS

International Search Report for PCT/CN2016/070584, dated Jun. 27, 2016, ISA/CN.
(Continued)

*Primary Examiner* — Thomas G Black
*Assistant Examiner* — Luat T Huynh
(74) *Attorney, Agent, or Firm* — Apex Attorneys at Law, LLP; Yue (Robert) Xu

(57) ABSTRACT

A method and device for controlling an unmanned aerial vehicle with a gesture are provided. A camera is arranged in the unmanned aerial vehicle, and the method includes: detecting a gesture in an image by using a gesture detection framework; judging whether the gesture is a predetermined gesture for controlling the unmanned aerial vehicle; acquiring a motion trajectory of the gesture in a case that it is determined that the gesture is the predetermined gesture for controlling the unmanned aerial vehicle; and controlling,
(Continued)

based on the motion trajectory of the gesture, the unmanned aerial vehicle to perform a control operation corresponding to the motion trajectory of the gesture, where a correspondence between a motion trajectory of a gesture and a control operation is predetermined.

4 Claims, 3 Drawing Sheets

(51) Int. Cl.
*B64C 39/02* (2006.01)
*G06F 3/01* (2006.01)
*G06K 9/00* (2006.01)
*G06K 9/46* (2006.01)
*B64D 47/08* (2006.01)
*G06F 3/03* (2006.01)

(52) U.S. Cl.
CPC .............. *G05D 1/08* (2013.01); *G06F 3/017* (2013.01); *G06F 3/0304* (2013.01); *G06K 9/00355* (2013.01); *G06K 9/4671* (2013.01); *B64C 2201/14* (2013.01)

(58) Field of Classification Search
USPC .................................................. 701/2, 3, 23
See application file for complete search history.

(56) References Cited

U.S. PATENT DOCUMENTS

| 2014/0198031 | A1 | 7/2014 | Xiong | |
|---|---|---|---|---|
| 2015/0370250 | A1* | 12/2015 | Bachrach | G05D 1/0016 701/2 |
| 2016/0273921 | A1* | 9/2016 | Zhou | G01S 19/49 |
| 2016/0376004 | A1* | 12/2016 | Claridge | B64C 19/00 701/3 |

FOREIGN PATENT DOCUMENTS

| CN | 103336967 A | 10/2013 |
|---|---|---|
| CN | 103376890 A | 10/2013 |
| CN | 104200487 A | 12/2014 |
| CN | 104680127 A | 6/2015 |
| CN | 104808799 A | 7/2015 |
| CN | 104915014 A | 9/2015 |
| CN | 105223957 A | 1/2016 |
| WO | 2008045144 A2 | 4/2008 |

OTHER PUBLICATIONS

Chinese 1st Office Action for CN201510616129.X, dated Aug. 18, 2017.

Gang-Zeng Mao et al., "Real-Time Hand Detection and Tracking against Complex Background", 2009 Fifth International Conference on Intelligent Information Hiding and Multimedia Signal Processing, Dec. 31, 2009, 4 pages.

Liu Yun et al., "An Automatic Hand Gesture Recognition System Based on Viola-Jones Method and SVMs", 2009 Second International Workshop on Computer Science and Engineering, Dec. 31, 2009, 5 pages.

Second Office Action dated May 2, 2018 for Chinese Application No. 201510616129.X, 12 pages, English translation provided by Global Dossier.

* cited by examiner

METHOD AND DEVICE FOR CONTROLLING UNMANNED AERIAL VEHICLE WITH GESTURE

CROSS REFERENCE OF RELATED APPLICATION

The present application is the national phase of International Application No. PCT/CN2016/070584, titled "METHOD AND DEVICE FOR CONTROLLING UNMANNED AERIAL VEHICLE WITH GESTURE", filed on Jan. 11, 2016, which claims priority to Chinese Patent Application No. 201510616129.X, titled "METHOD AND DEVICE FOR CONTROLLING UNMANNED AERIAL VEHICLE WITH GESTURE", filed on Sep. 24, 2015 with the State Intellectual Property Office of People's Republic of China, which is incorporated herein by reference in its entirety.

FIELD

The present disclosure relates to the technical field of unmanned aerial vehicle control, and in particular to a method and device for controlling an unmanned aerial vehicle with a gesture.

BACKGROUND

Presently, an unmanned aerial vehicle is more widely used, for example, in shooting at a high altitude, and shooting in a sport event and an important conference.

In the conventional technology, a conventional remote control and a remote control using a mobile phone are two main ways for controlling the unmanned aerial vehicle. In the conventional remote control, the unmanned aerial vehicle is controlled by controlling joysticks of top, bottom, left and right directions by hands. In the mobile phone remote control, the unmanned aerial vehicle is controlled by transplanting the joysticks for remote control by hands into the mobile phone.

However, in the way for controlling the unmanned aerial vehicle using the remote controller, an operator is required to have a proficient remote control skill, and a good operating feeling.

Hence, it is a need for those skilled in the art to provide a method and device for controlling an unmanned aerial vehicle with a gesture, with which a user can control the unmanned aerial vehicle without using the remote controller.

SUMMARY

To solve the technical problem, a method and a device for controlling an unmanned aerial vehicle with a gesture are provided, with which an unmanned aerial vehicle can be operated with a gesture without using a remote controller for controlling the unmanned aerial vehicle.

A method for controlling an unmanned aerial vehicle with a gesture is provided according to embodiments, where a camera is provided in the unmanned aerial vehicle and the method includes:
  detecting a gesture in an image using a gesture detection framework;
  judging whether the gesture is the same as a predetermined gesture for controlling the unmanned aerial vehicle;
  acquiring a motion trajectory of the gesture in a case that it is judged that the gesture is the predetermined gesture for controlling the unmanned aerial vehicle; and
  controlling, based on the motion trajectory of the gesture, the unmanned aerial vehicle to perform a control operation corresponding to the motion trajectory of the gesture, where the motion trajectory of the gesture and the control operation corresponding thereto are predetermined.

Preferably, the motion trajectory of the gesture is a motion trajectory formed by a motion of a single gesture or a motion trajectory formed by alternate operations of at least two gestures.

Preferably, in a case that the motion trajectory of the gesture is the motion trajectory formed by the motion of the single gesture, the acquiring a motion trajectory of the gesture includes:
  obtaining a motion parameter of a gesture in a current frame relative to a gesture in a last frame based on the gesture in the current frame and the gesture in the last frame, wherein the motion parameter comprises a rotation matrix R and a translation vector T;
  accumulating motion parameters between every two adjacent frames from the first frame to the current frame; and
  obtaining the motion trajectory of the gesture based on the accumulated motion parameters.

Preferably, in a case that the motion trajectory of the gesture is a motion trajectory formed by alternate operations of two gestures $H_1$ and $H_2$, the acquiring a motion trajectory of the gesture includes:
  acquiring M $H_1$s from the image, and judging whether a frame span K of the M $H_1$s is smaller than a preset number N of frames, wherein M and N each are integers;
  dividing K into (M−1) intervals equally and judging whether each of the (M−1) intervals comprises $H_2$, in a case that it is judged that the frame span K of the M $H_1$s is smaller than the preset number N of frames; and
  judging that the alternate operations of the two gestures $H_1$ and $H_2$ occurs and determining the motion trajectory of the gesture based on the alternate operations of the two gestures $H_1$ and $H_2$, in a case that it is judged that each of the (M−1) intervals comprises $H_2$.

Preferably, the obtaining a motion parameter of a gesture in a current frame relative to a gesture in a last frame based on the gesture in the current frame and the gesture in the last frame includes:
  extracting a FAST feature point from regions where the gestures are located with respect to images in the current frame and in the last frame
  calculating a BRIEF feature vector based on the FAST feature points;
  performing a brute force match on the BRIEF feature vector, and filtering out a wrong matching point in a brute force matching result using RANSAC to obtain a filtered matching point pair; and
  calculating an eigenmatrix E using the matching point and obtaining R and T by decomposing E.

A device for controlling an unmanned aerial vehicle with a gesture is further provided according to the embodiments of the present disclosure, where the unmanned aerial vehicle is provided with a camera and the device includes:
  a gesture detecting unit configured to detect a gesture in an image by using a gesture detection framework;

a gesture judging unit configured to judge whether the gesture is a predetermined gesture for controlling the unmanned aerial vehicle;

a gesture motion trajectory acquiring unit configured to acquire a motion trajectory of the gesture in a case that it is judged that the gesture is the predetermined gesture for controlling the unmanned aerial vehicle; and a control unit configured to control the unmanned aerial vehicle to perform a control operation corresponding to the motion trajectory of the gesture based on the motion trajectory of the gesture, wherein the motion trajectory of the gesture and the control operation corresponding thereto are predetermined.

Preferably, the motion trajectory of the gesture is a motion trajectory formed by a motion of a single gesture or a motion trajectory formed by alternate operations of at least two gestures.

Preferably, in a case that the motion trajectory of the gesture is a motion trajectory formed by the motion of the single gesture, the gesture motion trajectory acquiring unit includes:

a motion parameter acquiring subunit configured to obtain a motion parameter of a gesture in a current frame relative to a gesture in a last frame based on the gesture in the current frame and the gesture in the last frame, wherein the motion parameter comprises a rotation matrix R and a translation vector T;

an accumulating subunit configured to accumulate motion parameters between every two adjacent frames from the first frame to the last frame; and a trajectory acquiring subunit configured to obtain the motion trajectory of the gesture based on the accumulated motion parameters.

Preferably, in a case that the motion trajectory of the gesture is a motion trajectory formed by alternate operations of two gestures $H_1$ and $H_2$, the gesture motion trajectory acquiring unit includes:

a frame acquiring subunit configured to acquire M $H_1$s from the image;

a first judging subunit configured to judge whether a frame span K of the M $H_1$s is smaller than a preset number N of frames, wherein M and N each are integers;

a second judging subunit configured to divide K into (M−1) intervals equally and judge whether each of the (M−1) intervals comprises $H_2$, in a case that the first judging subunit determines that the frame span K of the M $H_1$s is smaller than the preset number N of frames; and a determining subunit configured to determine that alternate operations of two gestures $H_1$ and $H_2$ occurs, and determine the motion trajectory of the gesture based on the alternate operations of $H_1$ and $H_2$, in a case that the second judging subunit judges that each of the (M−1) intervals includes $H_2$.

Preferably, the motion parameter acquiring subunit includes:

a FAST feature point extracting subunit configured to extract a FAST feature point from regions where the gestures are located with respect to images in the current frame and in the last frame;

a BRIEF feature vector obtaining subunit configured to calculate a BRIEF feature vector based on the FAST feature points;

a matching subunit configured to perform a brute force match on the BRIEF feature vector and filter out a wrong matching point in a brute force matching result using RANSAC to obtain a filtered matching point pair; and a decomposing subunit configured to calculate an eigenmatrix E using the matching point, and obtaining R and T by decomposing E.

As compared with the conventional technology, the present disclosure has the following advantages.

With the method according to the embodiment, the gesture of a person is recognized by using the camera arranged in the unmanned aerial vehicle; the motion trajectory of the gesture is acquired in a case that it is determined that the gesture is the predetermined gesture for controlling the unmanned aerial vehicle; and the control operation corresponding to the motion trajectory is found based on the motion trajectory of the gesture, and the unmanned aerial vehicle is controlled to perform the control operation. One-to-one correspondences between motion trajectories of gestures and the control operations are predetermined. In this way, the unmanned aerial vehicle is controlled with a gesture, and a user does not need to control the unmanned aerial vehicle by controlling a remote controller. The method is simple and easy, and user experience is improved.

BRIEF DESCRIPTION OF THE DRAWINGS

To illustrate technical solutions according to embodiments of the disclosure or in the conventional technology more clearly, the following briefly describes the drawings according to embodiments of the disclosure. Apparently, the drawings are only some embodiments of the present disclosure, and other drawings may be obtained by those skilled in the art according to those drawings without creative efforts.

DETAILED DESCRIPTION OF THE EMBODIMENTS

The technical solutions of embodiments of the disclosure will be illustrated clearly and completely in conjunction with the drawings of the embodiments of the disclosure. Apparently, the described embodiments are only a few embodiments rather than all embodiments of the disclosure. Any other embodiments obtained by those skilled in the art on the basis of the embodiments of the present disclosure without creative work will fall within the scope of the present disclosure.

To make the above object, features and advantages of the disclosure more obvious and understandable, hereinafter the embodiments of the disclosure are described in detail in conjunction with the drawings.

First Method Embodiment

Figure 1:
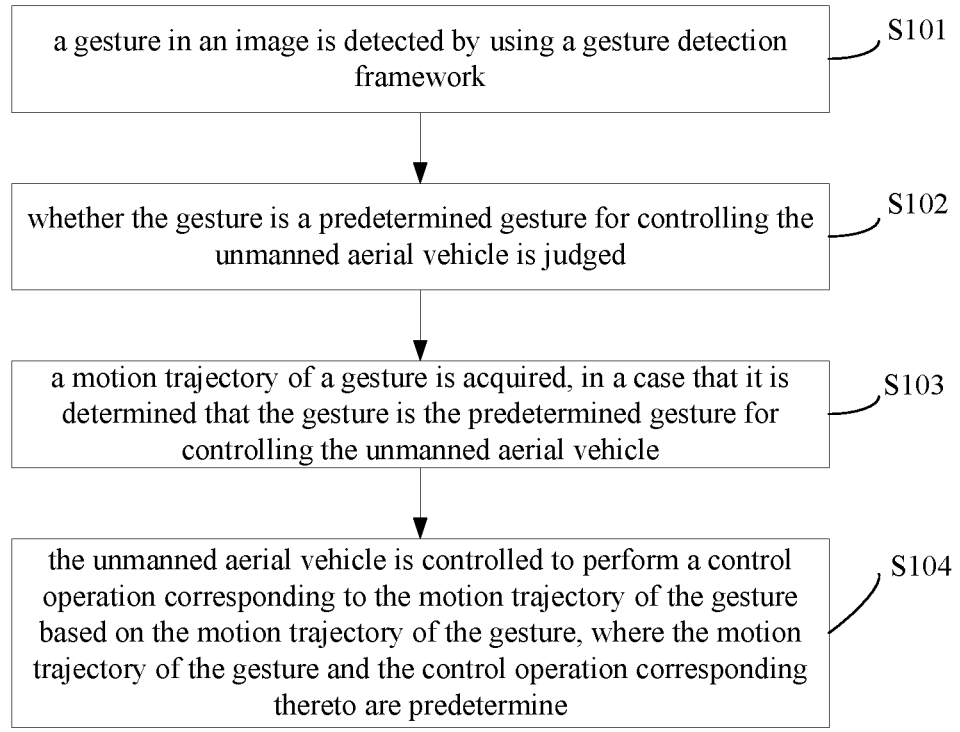
FIG. 1 is a flowchart of a first embodiment of a method for controlling an unmanned aerial vehicle with a gesture according to the present disclosure.

FIG. 1 is a flowchart of a first embodiment of a method for controlling an unmanned aerial vehicle with a gesture according to the present disclosure.

In the method for controlling the unmanned aerial vehicle with a gesture according to the embodiment, the unmanned aerial vehicle is provided with a camera, and the method includes step S101 to step S104.

In step S101, a gesture in an image is detected by using a gesture detection framework.

It should be noted that, the unmanned aerial vehicle is provided with a front-facing camera or a rear-facing camera.

An image shot by the camera of the unmanned aerial vehicle includes a hand, and a gesture in the image can be detected by using the gesture detection framework.

It should be noted that, the gesture detection framework is included in the conventional technology, a face detection model used in the gesture detection framework is improved in the present disclosure. In the present disclosure, many photos including gestures of a person are acquired from Internet as samples. Gesture regions of the samples are marked manually, and the marked gesture regions are intercepted.

It should be noted that, motion trajectories of different gestures correspond to different control operations. For example, finger splay and first are two different gestures, and a motion trajectory of the finger splay may include: waggling, moving up and down and moving left and right and so on. Similarly, a motion trajectory of first may include: waggling, moving up and down and moving left and right and so on.

In step S102, whether the gesture is a predetermined gesture for controlling the unmanned aerial vehicle is judged.

It should be noted that, not all gestures correspond to control operations, gestures corresponding to the control operations are predetermined, and a motion trajectory of a gesture is tracked only if the detected gesture is the predetermined gesture for controlling the unmanned aerial vehicle. If it is determined that the gesture is not the predetermined gesture for controlling the unmanned aerial vehicle, the motion trajectory of the gesture is not tracked.

In step S103, a motion trajectory of a gesture is acquired, in a case that it is determined that the gesture is the predetermined gesture for controlling the unmanned aerial vehicle.

In step S104, the unmanned aerial vehicle is controlled to perform a control operation corresponding to the motion trajectory of the gesture based on the motion trajectory of the gesture, where the motion trajectory of the gesture and the control operation corresponding thereto are predetermined.

For example, a control operation corresponding to left movement of splay finger is to control the unmanned aerial vehicle to move left horizontally, and a control operation corresponding to right movement of splay finger is to control the unmanned aerial vehicle to move right horizontally.

With the method according to the embodiment, the gesture of a person is recognized by using the camera arranged in the unmanned aerial vehicle; the motion trajectory of the gesture is acquired in a case that it is determined that the gesture is the predetermined gesture for controlling the unmanned aerial vehicle; and the control operation corresponding to the motion trajectory is found based on the motion trajectory of the gesture, and the unmanned aerial vehicle is controlled to perform the control operation. One-to-one correspondences between motion trajectories of gestures and the control operations are predetermined. In this way, the unmanned aerial vehicle is controlled with a gesture, and a user does not need to control the unmanned aerial vehicle by controlling a remote controller. The method is simple and easy, and user experience is improved.

Second Method Embodiment

Figure 2:
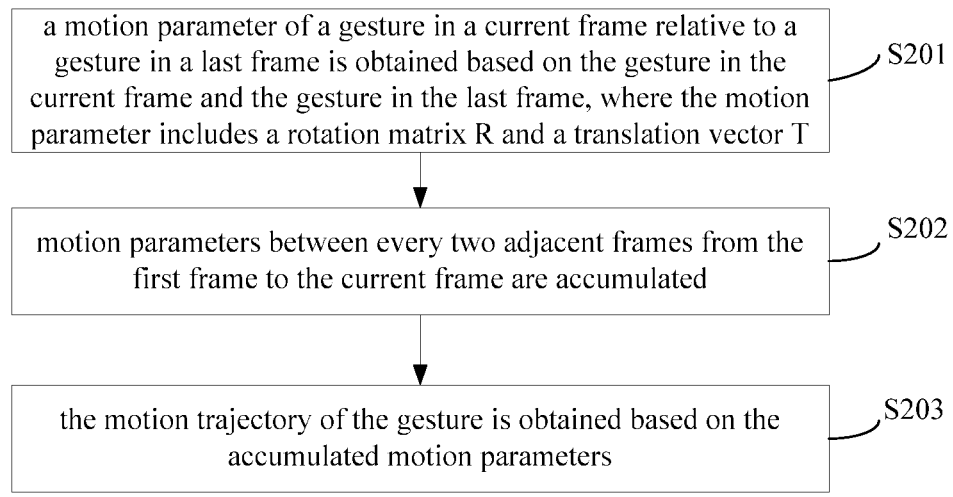
FIG. 2 is a flowchart of a second embodiment of the method for controlling an unmanned aerial vehicle with a gesture according to the present disclosure.

FIG. 2 is a flowchart of a second embodiment of a method for controlling an unmanned aerial vehicle with a gesture according to the present disclosure.

It should be noted that, motion trajectories of gestures involved in the embodiment of the present disclosure includes: a motion trajectory formed by a motion of a single gesture and a motion trajectory formed by alternate operations of at least two gestures.

The motion trajectory formed by the motion of the single gesture is a front-and-back motion, an up-and-down motion and a left-and-right motion.

The alternate operations of two gestures may be alternate operations of finger splay and fist.

In the embodiment, the control for the unmanned aerial vehicle with respect to the motion trajectory of the gesture formed by the motion of the single gesture is described firstly.

In a case that the motion trajectory of the gesture is the motion trajectory formed by the motion of the single gesture, the process of acquiring a motion trajectory of the gesture includes step S201 to step S203.

In step S201, a motion parameter of a gesture in a current frame relative to a gesture in a last frame is obtained based on the gesture in the current frame and the gesture in the last frame, where the motion parameter includes a rotation matrix R and a translation vector T.

The process of obtaining a motion parameter of a gesture in a current frame relative to a gesture in a last frame based on the gesture in the current frame and the gesture in the last frame includes:

extracting a FAST feature point from regions where the gestures are located with respect to images in the current frame and in the last frame;

calculating a BRIEF feature vector based on the FAST feature point;

performing a brute force match on the BRIEF feature vector and filtering out a wrong matching point in a brute force matching result using RANSAC to obtain a filtered matching point pair; and calculating an eigenmatrix E using the matching point, and obtaining R and the T by decomposing E.

The process of obtaining R and T by decomposing E is described in detail hereinafter.

It is assumed that a camera model P=K[R|T], then x=K[R|T]X, where x is an extracted FAST feature point; and it is defined that $\hat{x}=K^{-1}x=[R|T]X$, where X is a point in a space.

In this case, x' is a regularized coordinate of an image, a corresponding camera model for x' is P=[1|0], P'=[R|T], and a fundamental matrix corresponding to the camera is an eigenmatrix E. Thus it may be obtained according to the theory of binocular vision imaging that $E=[T]_x R=R[R^T T]_x$ and $\hat{x}'E\hat{x}=0$.

R and T can be calculated based on the eigenmatrix E, and a specific method is as follows.

It is assumed that a singular value decomposition (svd) of the eigenmatrix E is Udiag(1,1,0)V, and there are four ways to select R and T from the following equations:

$$\begin{cases} R = UWV^T & \text{or } UW^T V^T \\ T = +u_3 & \text{or } -u_3 \end{cases}$$

where, $$W = \begin{pmatrix} 0 & -1 & 0 \\ 1 & 0 & 0 \\ 0 & 0 & 1 \end{pmatrix},$$

and $u_3$ is a third column of U.

Unique R and T may be selected according to a condition that a reconstructed three-dimensional point is kept in right front of the camera when the camera is located at two different positions. That is, the camera is located at different positions in a current frame and in a last frame, and the gesture is kept in right front of the camera.

Positions and attitudes of hand in two adjacent frames are accumulated to obtain a position and an attitude of the current gesture relative to a gesture in a first frame.

It is assumed that a position and an attitude of hand in an i-th frame is $R_i$ and $T_i$, a variation of the gesture in an (i+1)-th frame relative to the gesture in the i-th frame is $R_{i,i+1}$ and $T_{i,i+1}$, and a position and an attitude of the gesture in a frame can be calculated according to the position and the attitude of the gesture in a last frame:

$$\begin{cases} R_{i+1} = R_i R_{i,i+1} \\ T_{i+1} = T_i + R_i T_{i,i+1} \end{cases}$$

Through the above formula, the position and the attitude in the i-th frame is transformed into the position and the attitude in the (i+1)-th frame. It is assumed that R=1, and T=0 in the first frame, the position and the attitude in the current frame may be obtained by iteration based on the above formula and a calculation result in the last frame.

In step S202, motion parameters between every two adjacent frames from the first frame to the current frame are accumulated.

In step S203, the motion trajectory of the gesture is obtained based on the accumulated motion parameters.

With the method according to the embodiment, the motion parameters of the gesture in the current frame relative to the gesture in the last frame is obtained based on the gesture in the current frame and the gesture in the last frame; the motion parameters between every two adjacent frames from the first frame to the current frame are accumulated; and the motion trajectory of the gesture is obtained based on the accumulated motion parameters, and the motion of the unmanned aerial vehicle is controlled based on the motion trajectory of the gesture. It can be understood that, in the method according to the present disclosure, the gesture and the motion trajectory of the gesture are recognized by the unmanned aerial vehicle, to control the motion of the unmanned aerial vehicle without any control from an external controller.

Third Method Embodiment

Figure 3:
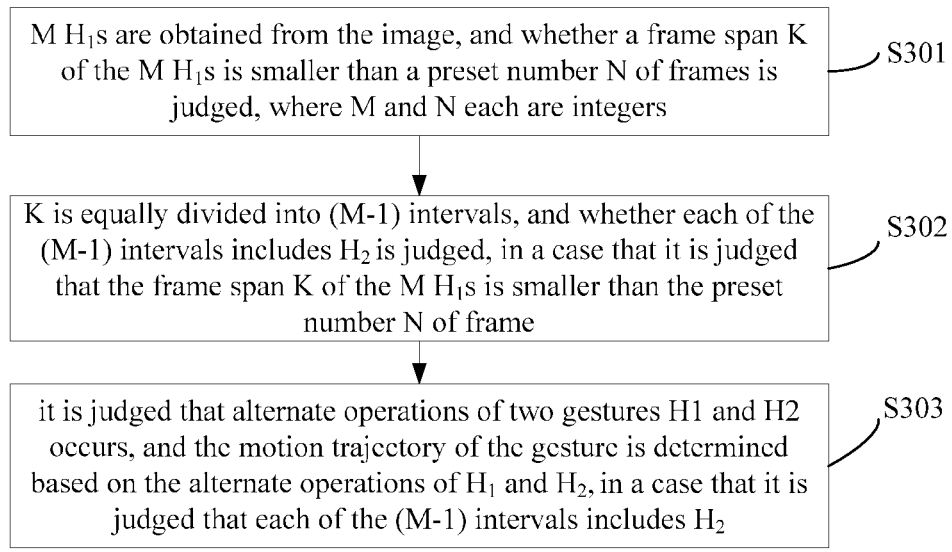
FIG. 3 is a flowchart of a third embodiment of a method for controlling an unmanned aerial vehicle with a gesture according to the present disclosure.

FIG. 3 is a flowchart of a third embodiment of a method for controlling an unmanned aerial vehicle with a gesture according to the present disclosure.

In the embodiment, a motion trajectory formed by alternate operations of at least two gestures is described. In order to facilitating description, the case that the motion trajectory is formed by alternate operations of two gestures is taken as an example for illustration hereinafter. It can be understood that, the motion trajectory may be formed by alternate operations of multiple gestures.

In a case that the motion trajectory of the gesture is a motion trajectory formed by alternate operations of two gestures $H_1$ and $H_2$, the process of obtaining a motion trajectory of the gesture includes step S301 to step S303.

In step S301, M $H_1$s are obtained from the image, and whether a frame span K of the M $H_1$s is smaller than a preset number N of frames is judged, where M and N each are integers.

It should be noted that, $H_1$ and $H_2$ each are found through a sequence of the image frames.

In step S302, K is equally divided into (M−1) intervals, and whether each of the (M−1) intervals includes $H_2$ is judged, in a case that it is judged that the frame span K of the M $H_1$s is smaller than the preset number N of frames.

In step S303, it is judged that alternate operations of two gestures H1 and H2 occurs, and the motion trajectory of the gesture is determined based on the alternate operations of $H_1$ and $H_2$, in a case that it is judged that each of the (M−1) intervals includes $H_2$.

In the method according to the embodiment, H1 and H2 are detected alternately within a sufficiently short time period.

It should be noted that, step S303 may alternatively includes: searching for $H_2$ in an interval before the first $H_1$ and in an interval after the last $H_1$ respectively, in a case that it is determined that each interval includes $H_2$. If a $H_2$ is found in the interval before the first $H_1$ or the interval after the last $H_1$, it is determined that the alternate operations of two gestures $H_1$ and $H_2$ occurs; and the motion trajectory of the gesture is determined based on the alternate operations of $H_1$ and $H_2$. That is, step S303 is performed to find whether $H_2$ is included in an edge interval.

With the method according to the embodiment, the gesture in the image frame is recognized, and whether two or more gestures alternately occur is determined; for example, in a case that two predetermined gestures for controlling the unmanned aerial vehicle alternately occur within a short time period, the unmanned aerial vehicle is controlled to perform a control operation corresponding to the alternate gestures. For example, $H_1$ is finger splay, and $H_2$ is fist, that is, alternate operations of an open hand and a closed hand are regarded as a motion trajectory of the gesture.

Based on the method for controlling an unmanned aerial vehicle with a gesture according to the above embodiments, a device for controlling an unmanned aerial vehicle with a gesture is further provided according to the present disclosure, and the operation principle of the device is described in detail in conjunction with the drawings hereinafter.

First Device Embodiment

Figure 4:
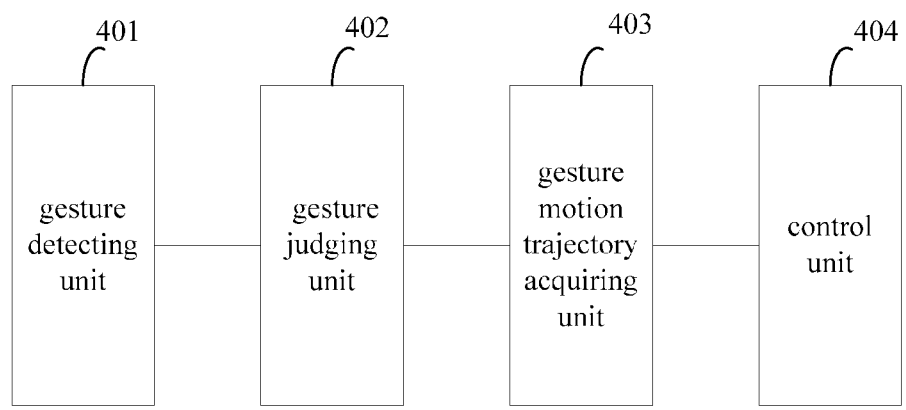
FIG. 4 is a schematic diagram of a first embodiment of a device for controlling an unmanned aerial vehicle with a gesture according to the present disclosure.

FIG. 4 is a schematic diagram of a first embodiment of a device for controlling an unmanned aerial vehicle with a gesture according to the present disclosure.

The unmanned aerial vehicle is provided with a camera, and the device for controlling the unmanned aerial vehicle with a gesture according to the embodiment includes a gesture detecting unit 401, a gesture judging unit 402, a gesture motion trajectory acquiring unit 403 and a control unit 404.

The gesture detecting unit 401 is configured to detect a gesture in an image by using a gesture detection framework.

It should be noted that, the unmanned aerial vehicle is provided with a front-facing camera or a rear-facing camera. An image shot by the camera of the unmanned aerial vehicle includes a hand, and a gesture in the image can be detected by using the gesture detection framework.

It should be noted that, the gesture detection framework is included in the conventional technology, a face detection model used in the gesture detection framework is improved in the present disclosure. In the present disclosure, many photos including gestures of a person are acquired from Internet as samples. Gesture regions of the samples are marked manually, and the marked gesture regions are intercepted.

It should be noted that, motion trajectories of different gestures correspond to different control operations. For example, finger splay and fist are two different gestures, and a motion trajectory of the finger splay may include: waggling, moving up and down and moving left and right and so on. Similarly, a motion trajectory of the fist may include: waggling, moving up and down and moving left and right and so on.

The gesture judging unit 402 is configured to judge whether the gesture is a predetermined gesture for controlling the unmanned aerial vehicle.

It should be noted that, not all gestures correspond to control operations, gestures corresponding to the control operations are predetermined, and a motion trajectory of a gesture is tracked only if the detected gesture is the predetermined gesture for controlling the unmanned aerial vehicle. If it is determined that the gesture is not the predetermined gesture for controlling the unmanned aerial vehicle, the motion trajectory of the gesture is not tracked.

The gesture motion trajectory acquiring unit 403 is configured to acquire a motion trajectory of the gesture in a case that it is judged that the gesture is the predetermined gesture for controlling the unmanned aerial vehicle.

The control unit 404 is configured to control the unmanned aerial vehicle to perform a control operation corresponding to the motion trajectory of the gesture based on the motion trajectory of the gesture, where the motion trajectory of the gesture and the control operation corresponding thereto are predetermined.

For example, a control operation corresponding to left movement of splay finger is to control the unmanned aerial vehicle to move left horizontally, and a control operation corresponding to right movement of splay finger is to control the unmanned aerial vehicle to move right horizontally.

With the device according to the embodiment, the gesture of a person is recognized by using the camera arranged in the unmanned aerial vehicle; the motion trajectory of the gesture is acquired in a case that it is determined that the gesture is the predetermined gesture for controlling the unmanned aerial vehicle; and the control operation corresponding to the motion trajectory is found based on the motion trajectory of the gesture, and the unmanned aerial vehicle is controlled to perform the control operation. One-to-one correspondences between motion trajectories of gestures and the control operations are predetermined. In this way, the unmanned aerial vehicle is controlled with a gesture, and a user does not need to control the unmanned aerial vehicle by controlling a remote controller. The method is simple and easy, and user experience is improved.

Second Device Embodiment

Figure 5:
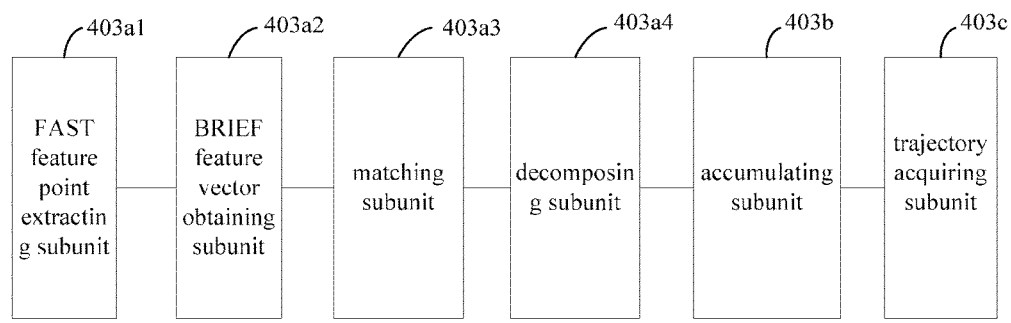
FIG. 5 is a schematic diagram of a second embodiment of the device for controlling an unmanned aerial vehicle with a gesture according to the present disclosure.

FIG. 5 is a schematic diagram of a second embodiment of the device for controlling an unmanned aerial vehicle with a gesture according to the present disclosure.

Motion trajectories of the gesture include a motion trajectory formed by a motion of a single gesture and a motion trajectory formed by alternate operations of at least two gestures.

In a case that the motion trajectory of the gesture is the motion trajectory formed by the motion of the gesture, the gesture motion trajectory acquiring subunit 403 includes a motion parameter acquiring subunit 403*a*, an accumulating subunit 403*b* and a trajectory acquiring subunit 403*c*.

The motion parameter acquiring subunit 403*a* is configured to acquire a motion parameter of a gesture in a current frame relative to a gesture in a last frame based on the gesture in the current frame and the gesture in the last frame, where the motion parameter includes a rotation matrix R and a translation vector T.

The accumulating subunit 403*b* is configured to accumulate motion parameters between every two adjacent frames from the first frame to the last frame.

The trajectory acquiring subunit 403*c* is configured to obtain the motion trajectory of the gesture based on the accumulated motion parameters.

The motion parameter acquiring subunit 403*a* includes a FAST feature point extracting subunit 403*a*1, a BRIEF feature vector obtaining subunit 403*a*2, a matching subunit 403*a*3 and a decomposing subunit 403*a*4.

The FAST feature point extracting subunit 403*a*1 is configured to extract FAST feature points from regions of respective images in the current frame and in the last frame.

The BRIEF feature vector obtaining subunit 403*a*2 is configured to calculate a BRIEF feature vector based on the FAST feature points.

The matching subunit 403*a*3 is configured to perform a brute force match on the BRIEF feature vector, and filter out a wrong matching point in a brute force matching result using RANSAC to obtain a filtered matching point pair.

The decomposing subunit 403*a*4 is configured to calculate an eigenmatrix E using the matching point, and obtain R and T by decomposing E.

With the device according to the embodiment, the motion parameters of the gesture in the current frame relative to the gesture in the last frame is obtained based on the gesture in the current frame and the gesture in the last frame; the motion parameters between every two adjacent frames from the first frame to the current frame are accumulated; and the motion trajectory of the gesture is obtained based on the accumulated motion parameters; and the motion of the unmanned aerial vehicle is controlled based on the motion trajectory of the gesture. It can be understood that, in the device according to the present disclosure, the gesture and the motion trajectory of the gesture are recognized by the unmanned aerial vehicle, to control the motion of the unmanned aerial vehicle without any control from an external controller.

Third Device Embodiment

Figure 6:
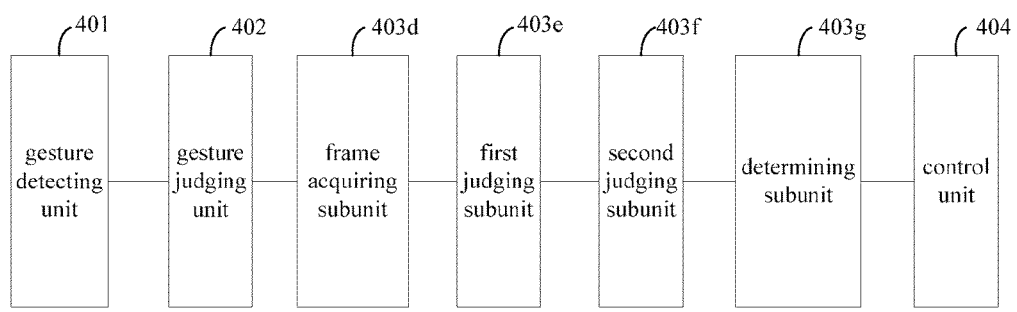
FIG. 6 is a schematic diagram of a third embodiment of the device for controlling an unmanned aerial vehicle with a gesture according to the present disclosure.

FIG. 6 is a schematic diagram of a third embodiment of a device for controlling an unmanned aerial vehicle with a gesture according to the present disclosure.

In the embodiment, in a case that the motion trajectory of the gesture is a motion trajectory formed by alternate operations of two gestures $H_1$ and $H_2$, the gesture motion trajectory acquiring unit includes a frame acquiring subunit 403d, a first judging subunit 403e, a second judging subunit 403f and a determining subunit 403g.

The frame acquiring subunit 403d is configured to acquire M $H_1$s from the image.

The first judging subunit 403e is configured to judge whether a frame span K of the M $H_1$s is smaller than a preset number N of frames, where M and N each are integers.

It should be noted that, $H_1$ and $H_2$ each are found through a sequence of the image frames.

The second judging subunit 403f is configured to divide K into (M−1) intervals equally and judge whether each of the (M−1) intervals includes $H_2$, in a case that the first judging subunit determines that the frame span K of the M $H_1$s is smaller than the preset number N of frames.

The determining subunit 403g is configured to determine that alternate operations of two gestures $H_1$ and $H_2$ occurs, and determine the motion trajectory of the gesture based on the alternate operations of $H_1$ and $H_2$, in a case that the second judging subunit determines that each of the (M−1) intervals includes $H_2$.

With the method according to the embodiment, $H_1$ and $H_2$ are detected alternately in a sufficiently short time period.

It should be noted that, the determining subunit 403g may be further configured to, in a case that it is determined that each interval includes $H_2$, search for H2 in an interval before the first H1 and in an interval after the last H1 respectively, determine that an alternate action between two gestures $H_1$ and $H_2$ occurs if a $H_2$ is found, and determine a motion trajectory of the gesture based on the alternate action between $H_1$ and $H_2$. That is, the determining subunit 403g is further configured to find whether $H_2$ is included in an edge interval.

With the device according to the embodiment, the gesture in the image frame is recognized, and whether two or more gestures alternately occur; for example, in a case that two predetermined gestures for controlling the unmanned aerial vehicle alternately occur within a short time period, the unmanned aerial vehicle is controlled to perform a control operation corresponding to the alternate gestures. For example, $H_1$ is finger splay, and $H_2$ is fist, that is, alternate operations of an open hand and a closed hand are regarded as a motion trajectory of the gesture.

The foregoing embodiments are only preferred embodiments of the disclosure and are not meant to limit the disclosure. The preferred embodiments according to the disclosure are disclosed above, and are not intended to limit the disclosure. Those of skills in the art may make, based on the disclosed method and technical content, some variations and improvements on the technical solutions of the disclosure, or make some equivalent variations on the embodiments without departing from the scope of the technical solutions. All simple modifications, equivalent variations and improvements made based on the technical essence of the disclosure without departing from content of the technical solutions of the disclosure fall in the scope of the technical solutions of the disclosure.

The invention claimed is:

1. A method for controlling an unmanned aerial vehicle with a gesture, wherein the unmanned aerial vehicle is provided with a camera and the method comprises:
   detecting a gesture in an image by using a gesture detection framework;
   judging whether the gesture is a predetermined gesture for controlling the unmanned aerial vehicle;
   acquiring a motion trajectory of the gesture in a case that it is judged that the gesture is the predetermined gesture for controlling the unmanned aerial vehicle; and
   controlling, based on the motion trajectory of the gesture, the unmanned aerial vehicle to perform a control operation corresponding to the motion trajectory of the gesture, wherein the motion trajectory of the gesture and the control operation corresponding thereto are predetermined;
   wherein the motion trajectory of the gesture is a motion trajectory formed by alternate operations of two gestures $H_1$ and $H_2$; and
   wherein the acquiring a motion trajectory of the gesture comprises:
      acquiring M $H_1$s from the image, and judging whether a frame span K of the M $H_1$s is smaller than a preset number N of frames, wherein M and N each are integers;
      dividing K into (M−1) intervals equally and judging whether each of the (M−1) intervals comprises $H_2$, in a case that it is judged that the frame span K of the M $H_1$s is smaller than the preset number N of frames; and
      judging that the alternate operations of the two gestures $H_1$ and $H_2$ occurs and determining the motion trajectory of the gesture based on the alternate operations of the two gestures $H_1$ and $H_2$, in a case that it is judged that each of the (M−1) intervals comprises $H_2$.

2. A device for controlling an unmanned aerial vehicle with a gesture, wherein the unmanned aerial vehicle is provided with a camera and the device comprises:
   a gesture detecting unit configured to detect a gesture in an image by using a gesture detection framework;
   a gesture judging unit configured to judge whether the gesture is a predetermined gesture for controlling the unmanned aerial vehicle;
   a gesture motion trajectory acquiring unit configured to acquire a motion trajectory of the gesture in a case that it is judged that the gesture is the predetermined gesture for controlling the unmanned aerial vehicle; and
   a control unit configured to control the unmanned aerial vehicle to perform a control operation corresponding to the motion trajectory of the gesture based on the motion trajectory of the gesture, wherein the motion trajectory of the gesture and the control operation corresponding thereto are predetermined;
   wherein the motion trajectory of the gesture is a motion trajectory formed by alternate operations of two gestures $H_1$ and $H_2$; and
   wherein the gesture motion trajectory acquiring unit comprises:
      a frame acquiring subunit configured to acquire M $H_1$s from the image;
      a first judging subunit configured to judge whether a frame span K of the M $H_1$s is smaller than a preset number N of frames, wherein M and N each are integers;
      a second judging subunit configured to divide K into (M−1) intervals equally and judge whether each of the (M−1) intervals comprises $H_2$, in a case that the first judging subunit determines that the frame span K of the M $H_1$s is smaller than the preset number N of frames; and a determining subunit configured to determine that alternate operations of two gestures $H_1$ and $H_2$ occurs, and determine the motion trajectory of the gesture based on the alternate operations of $H_1$ and $H_2$, in a case that the second judging subunit judges that each of the (M−1) intervals includes $H_2$.

3. A method for controlling an unmanned aerial vehicle with a gesture, wherein the unmanned aerial vehicle is provided with a camera and the method comprises:

detecting a gesture in an image by using a gesture detection framework;

judging whether the gesture is a predetermined gesture for controlling the unmanned aerial vehicle;

acquiring a motion trajectory of the gesture in a case that it is judged that the gesture is the predetermined gesture for controlling the unmanned aerial vehicle; and controlling, based on the motion trajectory of the gesture, the unmanned aerial vehicle to perform a control operation corresponding to the motion trajectory of the gesture, wherein the motion trajectory of the gesture and the control operation corresponding thereto are predetermined;

wherein the motion trajectory of the gesture is the motion trajectory formed by the motion of the single gesture;

wherein the acquiring a motion trajectory of the gesture comprises:

obtaining a motion parameter of a gesture in a current frame relative to a gesture in a last frame based on the gesture in the current frame and the gesture in the last frame, wherein the motion parameter comprises a rotation matrix R and a translation vector T;

accumulating motion parameters between every two adjacent frames from the first frame to the current frame; and obtaining the motion trajectory of the gesture based on the accumulated motion parameters; and wherein the obtaining a motion parameter of a gesture in a current frame relative to a gesture in a last frame based on the gesture in the current frame and the gesture in the last frame comprises:

extracting, by a feature extractor, feature point from regions where the gestures are located with respect to images in the current frame and in the last frame calculating, by a feature descriptor, a feature vector based on the feature points;

performing a brute force match on the feature vector, and filtering out a wrong matching point in a brute force matching result using a outlier detection method, to obtain a filtered matching point pair; and calculating an eigenmatrix E using the matching point and obtaining R and T by decomposing E.

4. The method for controlling an unmanned aerial vehicle with a gesture according to claim 3, wherein:

the feature extractor is FAST, features from accelerated segment test;

the feature descriptor is BRIEF, binary robust independent elementary features; and the outlier detection method is RANSAC, random sample consensus.

* * * * *